United States Patent
Sawatzki et al.

(10) Patent No.: US 11,267,512 B2
(45) Date of Patent: Mar. 8, 2022

(54) ROTATABLE ATTACHMENT OF AN INVERTER CONTROL SYSTEM TO A TRANSMISSION

(71) Applicant: FORD GLOBAL TECHNOLOGIES, LLC, Dearborn, MI (US)

(72) Inventors: Marius Sawatzki, Pulheim (DE); Daniel Meckenstock, Wuppertal (DE); Michael Spurling, Romford (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 203 days.

(21) Appl. No.: 16/689,670

(22) Filed: Nov. 20, 2019

(65) Prior Publication Data

US 2020/0156705 A1  May 21, 2020
US 2021/0129911 A9  May 6, 2021

(30) Foreign Application Priority Data

Nov. 20, 2018 (DE) .......................... 102018219828.4

(51) Int. Cl.
*B62D 21/15* (2006.01)
*B60L 58/10* (2019.01)
*B62D 21/09* (2006.01)
*H02K 47/02* (2006.01)

(52) U.S. Cl.
CPC ............ *B62D 21/152* (2013.01); *B60L 58/10* (2019.02); *B62D 21/09* (2013.01); *H02K 47/02* (2013.01)

(58) Field of Classification Search
CPC .... B62D 25/082; B62D 21/152; B62D 21/09; B60L 58/10; H02K 47/02; B60K 17/12
See application file for complete search history.

(56) References Cited

U.S. PATENT DOCUMENTS 5,476,151 A * 12/1995 Tsuchida ................. B60R 16/04
                                                                 180/274
6,213,245 B1    4/2001 Murata et al.
(Continued)

FOREIGN PATENT DOCUMENTS

DE        102004008647 A1    9/2005
DE        102015211009 A1    12/2016
(Continued)

OTHER PUBLICATIONS

German Examination Report DE 10 2018 219 828.4 Filed Mar. 13, 2020, 8 pages.

*Primary Examiner* — Gregory A Blankenship
(74) *Attorney, Agent, or Firm* — Brooks Kushman PC; David Kelley (57) ABSTRACT

A hybrid electric vehicle (HEV) includes an inverter control system connected to a transmission such that the connection secures the inverter control system to the transmission during operation while allowing limited pivoting or rotating of the inverter control system relative to the transmission during a frontal collision to modify the translational motion and reduce or avoid loading of rigid objects or components between the inverter control system and the vehicle cabin or occupant compartment. Positioning of an electric cable conduit or connector near or adjacent to the pivot or rotational axis reduces translational force on the conductors to reduce or avoid damage during a frontal collision.

20 Claims, 4 Drawing Sheets

(56) References Cited

U.S. PATENT DOCUMENTS

| | | | |
|---|---|---|---|
| 7,913,786 B2* | 3/2011 | Voigt | B60R 16/04 |
| | | | 180/68.5 |
| 8,336,953 B2* | 12/2012 | Greb | B60R 11/00 |
| | | | 296/193.04 |
| 8,824,151 B2 | 9/2014 | Ghannam et al. | |
| 8,893,843 B2* | 11/2014 | Hayano | B60L 15/007 |
| | | | 180/232 |
| 9,022,457 B2* | 5/2015 | Hirano | B60K 1/00 |
| | | | 296/187.03 |
| 9,205,749 B2* | 12/2015 | Sakamoto | B60L 50/51 |
| 9,630,501 B2* | 4/2017 | Shiba | B60R 16/0215 |
| 9,648,764 B2* | 5/2017 | Nakashima | B60L 3/0007 |
| 9,849,847 B2 | 12/2017 | Furuzawa | |
| 10,543,872 B2* | 1/2020 | Kirimoto | B62D 21/152 |
| 10,622,607 B2* | 4/2020 | Marpu | H01M 10/625 |
| 10,953,925 B2* | 3/2021 | Park | B62D 21/11 |
| 10,967,914 B2* | 4/2021 | Sasaki | B60R 16/02 |
| 2005/0040718 A1 | 2/2005 | Sesselmann | |
| 2005/0205316 A1* | 9/2005 | Yamafuji | B60R 16/04 |
| | | | 180/68.5 |
| 2005/0266740 A1 | 12/2005 | Kikuchi et al. | |
| 2012/0055721 A1* | 3/2012 | Matano | B60K 1/04 |
| | | | 180/65.1 |
| 2013/0008903 A1* | 1/2013 | Sakamoto | H05K 7/1432 |
| | | | 220/255 |
| 2013/0169003 A1* | 7/2013 | Kubo | B60R 16/04 |
| | | | 296/187.09 |
| 2013/0194114 A1 | 8/2013 | Ritter et al. | |
| 2013/0305761 A1* | 11/2013 | Mochizuki | B60H 1/3229 |
| | | | 62/239 |
| 2014/0333130 A1 | 11/2014 | Matano et al. | |
| 2014/0345960 A1* | 11/2014 | Yamanaka | H05K 5/03 |
| | | | 180/65.8 |
| 2015/0121767 A1* | 5/2015 | Nagamori | H05K 5/03 |
| | | | 49/463 |
| 2015/0305177 A1 | 10/2015 | Nakashima | |
| 2015/0364858 A1 | 12/2015 | Koszeghy et al. | |
| 2017/0018939 A1 | 1/2017 | Shiba | |
| 2020/0156705 A1* | 5/2020 | Sawatzki | B62D 21/152 |
| 2021/0053624 A1* | 2/2021 | Hamada | B60K 5/00 |

FOREIGN PATENT DOCUMENTS

| | | |
|---|---|---|
| DE | 102016208091 A1 | 12/2016 |
| DE | 202017104332 U1 | 8/2017 |
| DE | 202017104333 U1 | 8/2017 |
| DE | 202017104335 U1 | 8/2017 |
| JP | 2001322439 A | 11/2001 |

* cited by examiner

Figure 1

Prior art

ROTATABLE ATTACHMENT OF AN INVERTER CONTROL SYSTEM TO A TRANSMISSION

CROSS-REFERENCE TO RELATED APPLICATIONS

This application claims foreign priority benefits under 35 U.S.C. § 119(a)-(d) to DE Application 10 2018 219 828.4 filed Nov. 20, 2018, which is hereby incorporated by reference in its entirety.

TECHNICAL FIELD

The disclosure relates to a subassembly for a vehicle such as an electric or hybrid motor vehicle having a transmission and an inverter control system connected to direct movement of the inverter control system in a collision.

BACKGROUND

Motor vehicles often include a deformation zone or crumple zone to help protect the occupants in the event of a frontal collision. In particular in hybrid vehicles, but in other cases too, the increasing number of additional components combined into subassemblies take up more and more space and are often not deformable as a rule. Because of this, a more severe deformation of the bulkhead or wall between the engine and the occupants may occur in the event of a frontal collision in modern vehicles, in which case the deformation can also move the steering column and pedals in the direction of the occupants. The crumple zone is designed to attempt to provide a controlled deformation and movement of the individual components. In U.S. Pat. No. 6,213,245 B1, for example, an articulation on the drive shaft is provided so that the drive shaft moves away from the passenger compartment in the event of an impact.

In the following description, the X-direction in the vehicle coordinate system represents the longitudinal direction of the motor vehicle, whereas the Z-direction represents the vertical direction. The Y-direction corresponds to the horizontally oriented transverse direction of the vehicle.

The crumple zone serves not only to provide protection for the occupants from direct mechanical influence, but also to provide protection for the vehicle electronics, particularly where live cables for the electric motor are routed through the motor vehicle. U.S. Pat. No. 8,824,151 B2 discloses, for example, a housing with electrical components. The attachment holes for the attachment of the housing to the vehicle exhibit lateral openings as a transverse access for attachment screws, through which the attachment can work loose in the event of a lateral impact and the mechanical effect on the housing itself is reduced. As an alternative, predetermined breaking points are provided on the attachment flange of the housing.

An additional component in hybrid vehicles is the inverter control system. The inverter control system includes the power electronics and is therefore the connecting link between the battery and the electric motor. It converts the DC voltage of the high-performance battery into an AC voltage. This system may also be referred to as an ISC (Inverter System Controller).

Impairment of the driver's compartment in the region of the bulkhead at the level of the steering column may occurring during a collision, either by the engine block, by transmission components, by the battery, or by the inverter control system contacting the brake booster. The latter is usually attached to the bulkhead at the level of the steering column and can move towards the passenger compartment in the X-direction in the event of a frontal collision as a result of a displacement of the drivetrain in the X-direction and the Y-direction. This may lead to a deformation of the bulkhead and thus also to a displacement of the pedals, which are connected to the brake booster, for example by means of bolts. It is difficult or almost impossible, however, in the event of a collision by a frontal impact, to prevent contact of the aforementioned components with the brake booster without a significant reduction in the size (length/width) of the interacting components. Different solutions for this potential intrusion during a collision are proposed in the prior art.

It is proposed in DE 20 2017 104 332 U1 that a transmission that moves in the X-direction in the event of a frontal collision presses against the housing of the brake booster directly or indirectly from below via an actuator, such as a wedge. The brake booster is secured by a rail-like connection with skids, which is movable along the bulkhead in the Z-direction. In addition, pin-shaped attachment elements are designed so that they deform or rupture in the Z-direction in the event of a shear stress occurring. DE 20 2017 104 333 U1 in addition proposes an actuator, which is capable of deforming, for example so that its components are able to change their position relative to one another when a force is applied. The components are configured as swiveling elements, for example, wherein the pivot axes of the swiveling elements of the actuator are oriented in the Y-direction, such that the actuator is able to swivel upwards in the Z-direction. The actuator can also be configured as an angle arm according to DE 20 2017 104 335 U1. In addition, the brake booster can be secured in slotted holes in the bulkhead, of which the longitudinal extent additionally facilitates a movement of the brake booster in the Z-direction.

DE 10 2004 008 647 A1 relates to an arrangement of a brake booster in a motor vehicle, wherein the arrangement is intended to prevent the displacement of the brake booster in the X-direction by the engine cradle. The engine cradle possesses an inclined sliding surface for this purpose and, if necessary, an additional brake booster inclined sliding surface on the brake booster. The brake booster slides away on the engine cradle in the event of a frontal collision of the vehicle.

DE 10 2015 211 009 A1 and DE 10 2016 208 091 A1 propose a cone-shaped deflection element, which can be screwed into position at one end of the connecting rod of the brake booster to direct a component moving in the X-direction on the conical external surface of the cone and to prevent the transmission of a load onto the connecting rod during a frontal collision. As an alternative, a housing of the inverter control system itself can possess this deflection element, by means of which the housing of the inverter control system and the brake booster slide over one another in the event of a frontal collision.

SUMMARY

Considering the aforementioned prior art, the present inventors have recognized that connection between an inverter control system and a transmission therefore offers further room for improvement. In particular, further actuators or deflection elements represent additional components, which presume an unobstructed engine compartment. This space is itself may no longer be available for the deformation and movement of the components within the engine compartment, which has a negative effect on the effectiveness of the crumple zone. Furthermore, this often results in having the components in a separate housing, whereby the space-saving integration or arrangement is also made more difficult.

One or more embodiments according to the disclosure may improve performance of the deformation zone of a motor vehicle in the event of a frontal collision by including a subassembly mounted to provide directed motion in the event of a frontal collision to avoid contact with the brake booster or other non-deformable object to reduce the likelihood of intrusion of components into the occupant compartment.

It should be noted that the features and measures mentioned individually in the following description with respect to any particular embodiment may be combined with one another in any desired technically feasible manner to form other embodiments of the claimed subject matter that may not be explicitly illustrated or described. The description additionally characterizes and specifies one or more representative embodiments in conjunction with the figures. The description explains the embodiments with respect to a representative left-hand-drive vehicle. However, those of ordinary skill in the art will recognize that various features related to the directed movement of one or more components during a frontal collision may also apply in the case of a vehicle with right-hand-drive although some adjustments or adaptations may be required depending on the particular application and implementation.

The present disclosure relates to a subassembly for a vehicle, in particular for a hybrid motor vehicle, having a transmission and an inverter control system, wherein the trans-mission and the inverter control system are connected or fastened together. According to one or more embodiments of the disclosure, the inverter control system is capable of being rotated or turned in relation to the transmission in a direction of rotation, that is to say about an axis of rotation, when subjected to a sufficient force. The transmission is preferably securely mounted in the engine compartment of the vehicle to prevent its rotation and is connected to the engine, whereas the inverter control system is mounted to be able to turn or rotate in relation to the transmission in response to a sufficient force, such as may be generated during a frontal collision. Conversely, the opposite is also possible in principle, however, wherein the first case is used as the basis for the further description of the embodiments. The expression "able to rotate" as used herein means that the inverter control system is capable of being moved in or against a direction of rotation or about an axis of rotation. In other words, the transmission and the inverter control system can be moved relative to one another with a clearance or can be guided in a rotatory or pivotal manner. As a result, the inverter control system is able to change its position in the engine compartment in the event of a frontal collision and is thus even able to assume the deflection function of a deflection element for the brake booster. Sliding on from the front against the brake booster or other components in the region of the bulkhead can be prevented by the changed orientation of the inverter control system. As such, additional deflection elements can be dispensed with.

Two types of brake booster systems are commonly employed: on the one hand the conventional vacuum brake booster, and on the other hand an electrical systems, known as an Electric Brake Booster or EBB. The present disclosure may be utilized in either type of system. The EBB itself may be regarded as a rigid body similar to an ESP module, and a conventional brake booster can contain connecting rods/stays/tie rods, etc., which transmit applied loads or displacements directly to the pedals in the vehicle interior.

In one or more embodiments, the transmission and the inverter control system are mounted in such a way that they are able rotate or turn in relation to one another about a fixing connection by means of a fixing connection configured as an axis of rotation and by means of at least one guide connection configured as a rotation or pivot guide. The guide connection guides the rotatory movement about an axis of rotation, which may also translate, or configured as a fixing or pivoting connection. A rotatory movement is also possible exclusively around the fixing connection, whereas the at least one guide connection makes a translational movement possible. The axis of rotation runs generally parallel to the Z-axis of the vehicle, that is to say vertically. The rotational movement thus takes place mainly in a plane which extends through the X-direction and the Y-direction. The fixing connection can be configured as a simple drilled hole. The inverter control system can be deflected by this type of connection between the inverter control system and the transmission in the event of a frontal collision, without deflection elements being necessary on a separate housing of the inverter control system and/or the transmission. Both components can thus be configured integrally in a housing, for example simply separated from a mounting plate or a connecting flange. This construction method will play a more significant role in the future.

The transmission and the inverter control system are connected to one another preferably by means of one or more fastening means for fixing and/or guiding, such as a screw, bolt, pin, slot, etc. The inverter control system rotates or turns in the context of the given attachment or in the context of the specified fastening means. A bolt, screw, pin, or similar fastening means can constitute the axis of rotation in the fixing connection, for example. Inside the guide connections, the bolts or screws are guided at least over a section of the guide connection for a translational movement. A particularly cost-effective assembly of the transmission and inverter control system is achievable in this way without a separate housing.

In the subassembly, one or more fastening means for fixing or holding in place can be arranged within a recess in each case, wherein at least one recess is configured as a slotted hole for a guided movement of a fastening means in a guide connection having a longitudinal axis. A fastening means can move in a guided manner along the longitudinal axis of the slotted hole or the other recess in the event of a frontal collision, and the movement of the inverter control system is thus able to be controlled as desired during a frontal collision to avoid transferring a significant translational force to the pedals or other rigid or non-deformable components that could impinge on the vehicle occupants. In this case, the room available for a fastening means and a recess to move relative to one another is typically provided by a first abutment or abutment region as a starting position in the recess and by a second abutment or abutment region as an end position in the recess.

In one or more embodiments, the slotted hole or the slotted holes in the long dimension are dimensioned or sized so that, as it turns, a specified displacement of the inverter control system and/or of a region of the inverter control system can be achieved in a Y-direction transversely to a vehicle longitudinal axis. The complete inverter control system is naturally not capable of displacement by the fixing connection in a translational manner in relation to the transmission. The expression displacement is understood to denote the rotational movement of the inverter control system, of which the side walls, boundary edges and/or corners reorient themselves in the engine compartment. Individual corners, boundary edges or side walls thereby experience a displacement compared to their original position, in the X-direction and/or in the Y-direction. Overlapping of the inverter control system with the brake booster in the Y-direction can be avoided by the displacement of the corresponding corner in the Y-direction. In this way, the inverter control system is prevented at least from positioning itself on the brake booster and pushing the brake booster through the bulkhead in the direction of the vehicle occupants. Instead, a side wall of the inverter control system forms an inclined surface in this way in relation to the brake booster, on which no significant force is able to be transmitted in the X-direction, and the two components are able slide over one another when they are pushed onto one another.

In an optional, further development of the disclosure, at least one of the recesses configured as slotted holes possesses a curvature of the longitudinal axis. The radius of curvature extends along a circular path with the axis of rotation of the fixing connection as the midpoint. As a result, the rotatory movement of the inverter control system in the event of a frontal collision can be guided reliably from a first abutment of the recess to a second abutment of the recess.

As an alternative or in addition, at least one of the recesses configured as slotted holes extends conically along the longitudinal axis in the direction of rotation and/or the at least one recess exhibits a conical opening progression. Simplified loosening of an already rotated inverter control system is facilitated by such a design. The slotted holes thus widen out in a direction of rotation of the inverter control system, as a result of which the fastening means are no longer guided with increasing rotation, but an additional free play occurs instead, which is available for the effectiveness of the crumple zone in the engine compartment. The guide connection loosens after a few millimeters of guided movement or guided rotation. In addition, easier dismantling of the subassembly from an accident-damaged vehicle is then applicable, which facilitates recycling of the components.

The surfaces of the transmission and of the inverter control system facing towards one another may form a connection region and/or a flange region and/or are simply designed for support over their entire surface. In other words, the transmission and the inverter control system lie essentially flush against one another. The transmission and the inverter control system exhibit no engagements or other inter-meshing with one another, with or without a separate housing. Apart from the flush contact, preferably no additional positive-locking or non-positive-locking connections are executed between the inverter control system and the transmission. As a result, there are no obstructions to turning the two components in relation to one another, which simplifies turning or rotation. Turning or rotation can be improved additionally by the appropriate lubrication or coating of the flush-fitting connection region and/or the flange region, wherein corrosion protection for the transmission and the inverter control system can be assured at the same time.

In addition, a seal can be arranged optionally between the transmission and the inverter control system exclusively on a connecting edge of the connection region and/or the flange region. The seal made of rubber material, for example, between the transmission and the inverter control system is designed in such a way that it offers the least possible resistance to turning the two components in relation to one another. The contact surface of the seal in the connection region and/or the flange region is thus kept to a minimum. The fastening means (bolts, screws) are also in-stalled in such a way that the clamping force or the retaining force for the static state can be kept as low as possible.

In addition, at least one cable duct with one or more power supply lines can be arranged adjacent to the fixing connection, in particular adjoining the fixing connection or in the vicinity of the fixing connection. This should be understood to denote that the distance between the cable duct and the fixing connection is smaller than the distance between the cable duct and one or more, in particular further guide connections. The cable duct contains the live cables in the high-voltage region and the low-voltage region for the electric motor of the hybrid vehicle. As a result, the translational movement in the region of the cable ducts can be kept low, wherein the risk of damage to the power supply lines in the event of a frontal collision is reduced. Even at the maximum possible displacement of the corner regions or of the lateral boundary walls of the inverter control system, the translational displacement in the corresponding region is comparatively small as a result of the closeness of the cable ducts to the fixing connection and thus to the fixed midpoint of the rotational movement. As an alternative or in addition, the cable duct can be of enlarged configuration, in order that the power supply lines have a greater range of movement.

DETAILED DESCRIPTION

As required, detailed embodiments are disclosed herein; however, it is to be understood that the disclosed embodiments are merely representative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In the different Figures, identical parts are provided with the same reference designations, for which reason these are generally described only once. In the Figures, the embodiments are described by way of example on the basis of the transmission and inverter control system components. Similarly, the described embodiments for turning can also be provided on other types of housings or components in the engine compartment of a vehicle, however, which have a similar geometry to an inverter control system and/or a transmission and are displaced in a similar manner in the X-direction in the event of a frontal collision.

Figure 1:
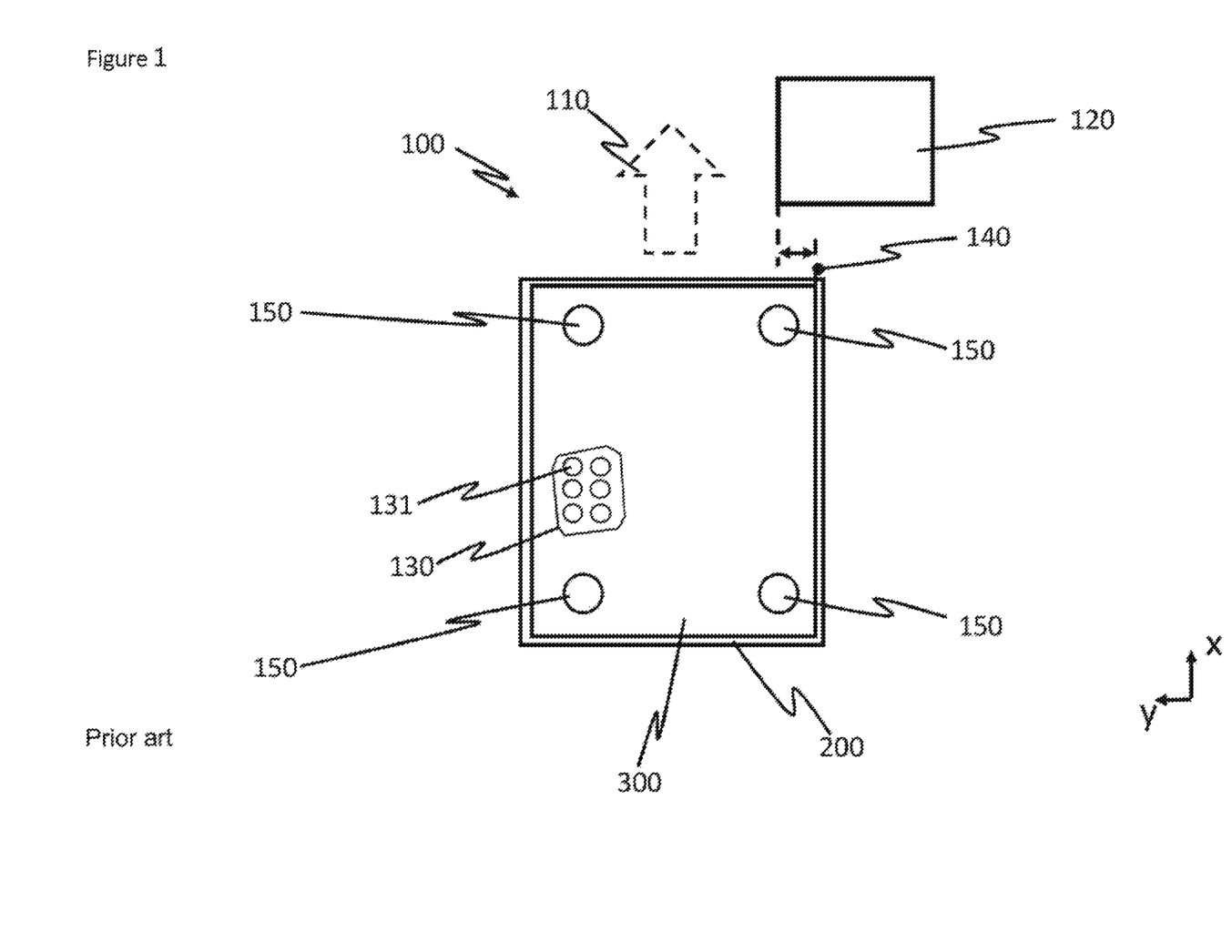
FIG. 1 depicts a schematic view from above of a subassembly known from the prior art.

The schematic view from above in FIG. 1 depicts a subassembly 100 known from the prior art. The subassembly 100 consists of an inverter control system 300, which is arranged in the Z-direction (out of the page) above a transmission 200. For an easier representation, the transmission 200 is represented slightly enlarged compared to the inverter control system 300. The transmission 200 and the inverter control system 300 are firmly connected to one another by four fastening means 150, for example bolts or screws. Movement of the transmission 200 and the inverter control system 300 towards one another is not envisaged. Even if the selected representation implies an embodiment of the transmission 200 and of the inverter control system 300 in a separate housing, both components can be realized in a single housing. Because of the limited space available in an engine compartment, it is unavoidable for an overlap 140 in the Y-direction with a further component, for example the brake booster 120. In the event of a frontal collision, as a result of the displacement of the entire drivetrain in the direction of displacement 110, the subassembly 100 would move in the X-direction through the engine bay onto the passenger cell (not depicted here). In the region of the overlap 140, it would finally (in the case of a motor vehicle with left-hand drive) collide with the brake booster 120 and, because of the load path, would force this through the bulkhead (not depicted here) against the vehicle occupants. Similarly positioned components would be affected accordingly in the case of a motor vehicle with right-hand drive. A cable duct 130 with live power supply lines 131 could be damaged or deformed at the same time, with the attendant risk of short circuits with high-voltage components. It is therefore desirable, on the one hand, to eliminate the overlap 140 as far as possible and, at the same time, to protect the cable duct 130 from mechanical influence.

Figure 2:
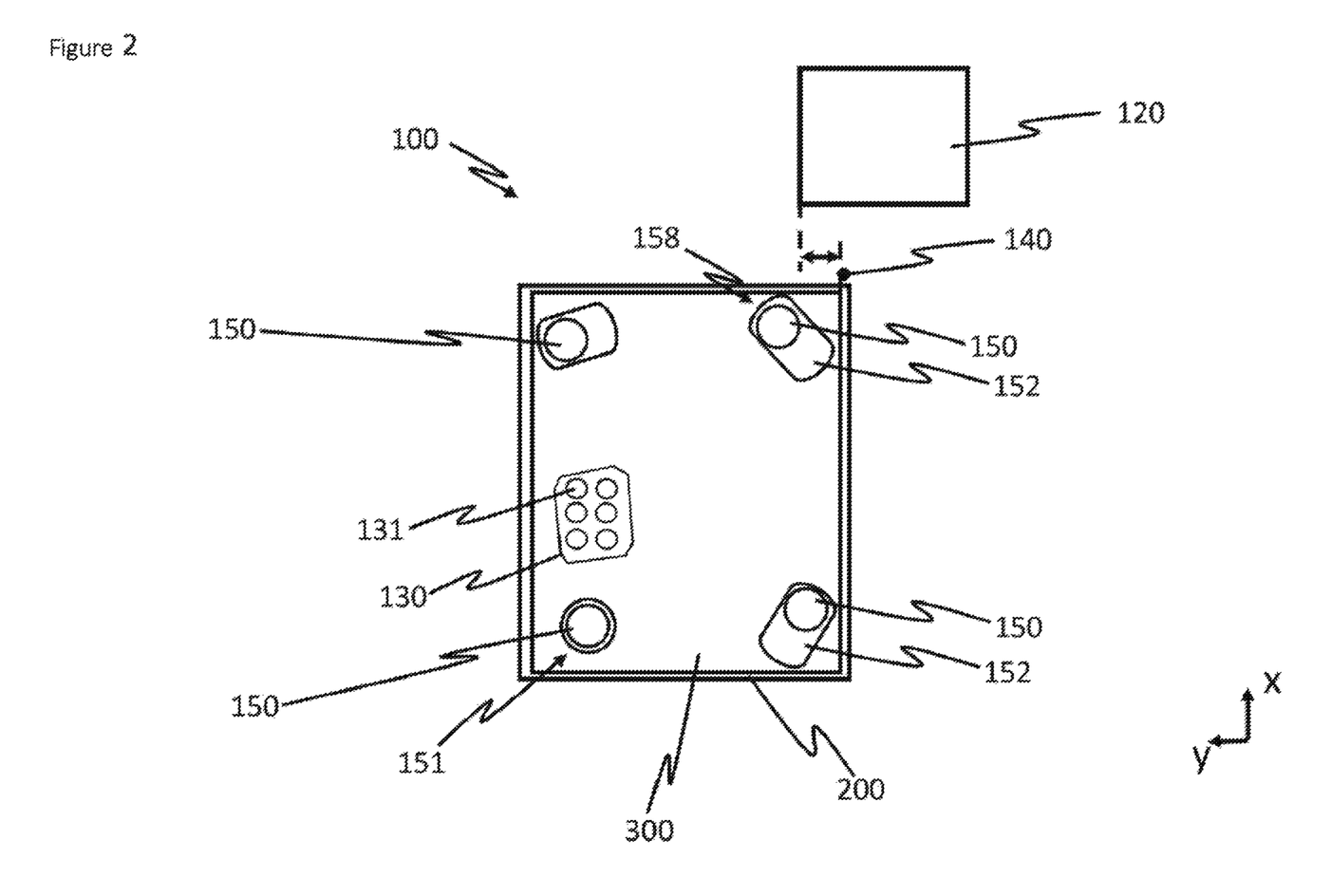
FIG. 2 depicts a schematic view from above of an illustrative embodiment of a subassembly according to the disclosure.

FIG. 2 depicts a representative embodiment according to the disclosure including a subassembly 100, in which the transmission 200 and the inverter control system 300 are mounted in a manner in which they are capable of being caused to rotate or turn in relation to one another. In this case, one of the four connecting or fastening means 150 is configured as a fixing connection 151, wherein typically the connecting or fastening means 150 which is selected is positioned or arranged furthest away from the brake booster 120. A bolt can be mounted in this case with positive locking in a recess 152 and can permit a rotational movement exclusively in the direction of rotation 160 (see FIG. 3). The other three fastening means 150 are configured as guide connections 158, wherein one guide connection 158 would be sufficient in principle or several guide connections 158 can also be used. Depending on the space available, the guide connections 158 can be positioned differently in the connection region between the transmission 200 and the inverter control system 300. In the representative embodiment illustrated, the guide connections 158 are positioned peripherally in each case in a corner region of the inverter control system 300. The guide connections 158 are configured with elongate recesses 152, for example slotted holes. A displacement of the fastening means 150 with regard to the recesses 152 is possible, therefore, whereas in the fixing connection 151 the inverter control system 300 is connected rigidly to the transmission 200 with regard to a translational movement.

Figure 3:
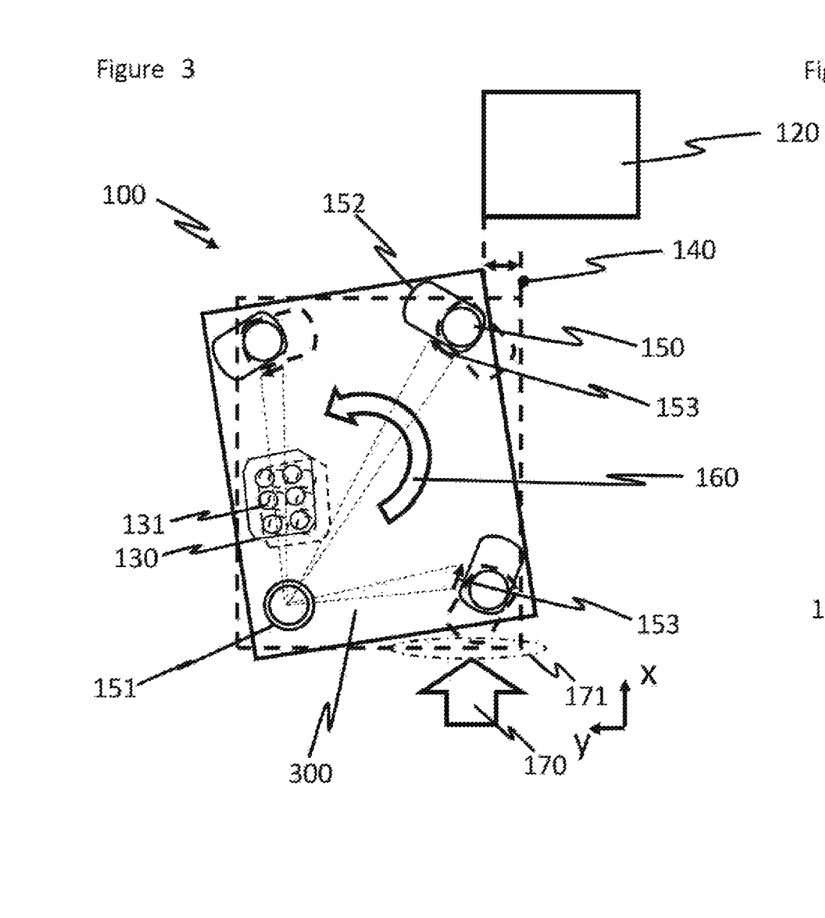
FIG. 3 depicts a schematic view from above of an illustrative embodiment of a subassembly turned according to the disclosure.
Figure 4:
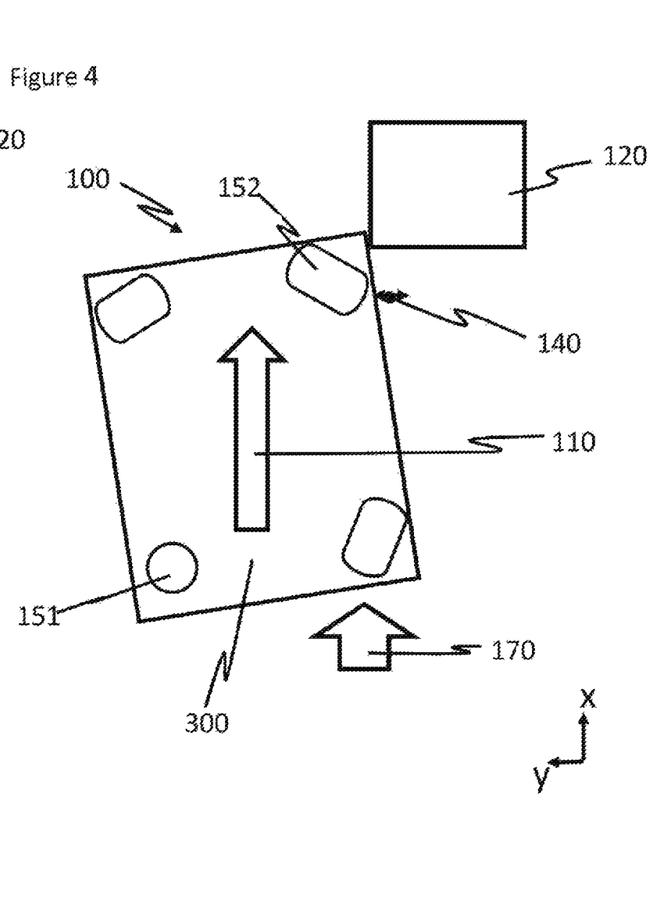
FIG. 4 depicts a schematic view from above of an illustrative embodiment of a subassembly turned and displaced according to the disclosure.

FIGS. 3 and 4 depict the dynamic behavior of the subassembly 100 in the event of a frontal collision. The direction of impact 170 in the crumple zone 171 in this case takes place in or substantially in the marked direction of the arrow. The position of the inverter control system 300, the recesses 152, the cable duct 130 and the power supply lines 131 before turning as the result of an impact in the crumple zone 171 is marked with dashed lines. A displacement 140 in or opposite the Y-direction of the vehicle is produced by the rotation or the turning of the inverter control system 300 in the direction of rotation 160. The displacement 140 generated thereby corresponds at least to the amount of the overlap 140 (see FIGS. 1 and 2) which was present in the static state between the inverter control system 300 and the brake booster 120. In the crumple zone 171, the inverter control system 300 recedes in relation to the housing of the transmission 200 or the transmission 200 and forms an inclined side or an inclined side wall in relation to the brake booster 120. The inverter control system 300 itself is oriented like a securely mounted static deflection element. The fixing connection 151 initially remains substantially stationary at the previously determined fixing point, whereas the recesses 152 move translationally in the direction of rotation 160. The distance travelled by each individual recess 152 corresponds to a recess displacement 153, which is indicated with dashed lines and with an arrow. The recesses 152 or the slotted holes shift along the fastening means 150 or the bolts until the fastening means 150 forms an abutment on the opposite boundary edge or boundary wall of the elongated recess 152. All the recesses 152 move along a circular path about the axis of rotation of the fixing connection 151. The subjacent transmission 200 (see FIG. 1) is partially exposed during the rotational movement. The cable duct 130 also moves along a circular path. The arrangement adjacent to or adjoining the fixing connection 151 means that the displacement, that is to say the whole of the distance traveled by the cable duct 130, is small. At the same time, the cable duct 130 is designed in such a way that the live cables 131 exhibit a sufficiently large distance to the boundary wall of the cable duct 130. A mechanical impairment of the power supply lines 131 of the high-voltage and low-voltage lines can be reduced or entirely prevented by the enlargement of the cable duct 130 in combination with the positioning adjoining or in the vicinity of the fixing connection 151, and also because the cables of the power supply lines 131 permit a sufficient relative movement between the power supply lines 131 and the cable duct 130.

According to FIG. 4 it is unavoidable and, for an effective crumple zone of a vehicle in the event of a frontal collision, also desirable that the inverter control system 300 together with the entire subassembly 100 or the entire drive train is displaced and the impulse of the impact is dispersed by deformation. The direction of displacement 110 in this case runs substantially in the X-direction, which corresponds to the direction of impact 170. However, the direction of impact 170 and/or the direction of displacement 110 can also exhibit in addition a component in the Y-direction and/or in the Z-direction. The brake booster 120 is not displaced or is displaced only slightly in the X-direction by the displacement 140 of regions of the inverter control system 300 in the Y-direction. The expression "region" is understood to denote in particular the corner or the corner region of the inverter control system 300, which lies along a diagonal of the inverter control system 300, lies opposite the fixing connection 151, and which would form the overlap 140 (see FIG. 1) with the brake booster 120. As a result of this, the inverter control system 300 and/or the brake booster 120 are displaced into one another. They nest into one another almost, or they move past each other. The inverter control system 300 and/or the brake booster 120 are deflected. The free space next to the brake booster 120 can be used for the effective crumple zone. The load path inside the engine compartment is deactivated as a consequence of the frontal collision, whereby the occupants of the vehicle remain protected from mechanical influence as a result of the load path.

Figure 5A:
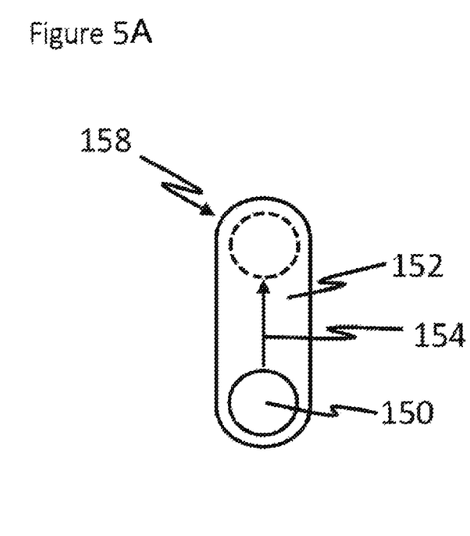
FIGS. 5A-C depict schematic views from above of illustrative embodiments of a guide connection according to the disclosure.
Figure 5B:
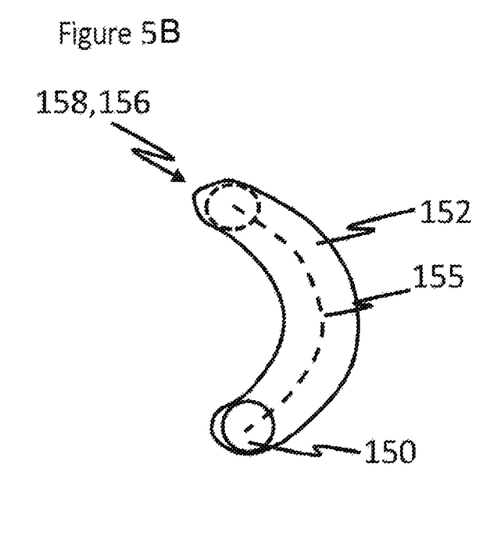
Figure 5C:
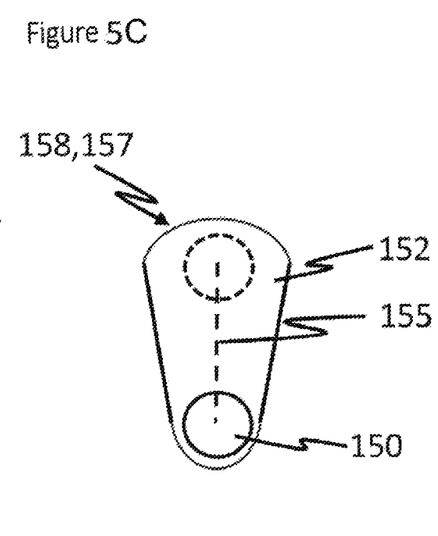

FIGS. 5A-5C depict different variants of a guide connection 158, of which the individual features can also be combined with one another. As an alternative to the recess 152, the fastening means 150 can also be displaced in a translational manner, whereas the recess 152 remains stationary during the rotation of the inverter control system 300 or during the translational movement of the fastening means 150 (see FIG. 3). The fastening means 150 is also connected, for example, to the inverter control system 300 so as to be capable of being moved, whereas the recesses 152 are a component part of the transmission 200 or of the housing of the transmission 200. The displacement 154 of the fastening means resulting therefrom is represented by an arrow in FIG. 5A. The corresponding end position of the fastening means 150 on the abutment of the recess 152 on completion of the translational movement is represented as a dashed circle.

FIG. 5B depicts a guide connection 158, in which the longitudinal axis 155 of the elongate recess 152 is curved or exhibits a curvature progression. The curvature progression corresponds to a circular path with the fixing connection 151 (see FIG. 3) or the axis of rotation of the fixing connection 151 as the midpoint. As a result, the rotational movement 160 (see FIG. 3) or the translational movement of the attachment means 150 for the rotation of the inverter control system 300 from the first abutment of the recess 152 to the second abutment of the recess 152 is guided more stably, wherein the intended displacement 140 in the Y-direction (see FIGS. 3/4) continues to be assured.

FIG. 5C depicts a guide connection 158, in which the recess 152 exhibits a conical opening progression 157. Along the translational movement of the attachment means 150, the recess 152 loses the guiding function for the fastening means 150 with increasing rotation of the inverter control system 300. A loosening effect occurs in point of fact. The starting position at the first abutment of the recess 152 is still also a guided position, whereas the end position at the second abutment of the recess 152 is a loosened position. This loosening effect of the guide connection 158 can accomplish two objects: on the one hand, an additional clearance occurs, which helps to further interrupt or to deactivate the load path as a result of a frontal collision. On the other hand, when dismantling the accident-damaged vehicle, easier disassembly of the subassembly 100 from the inverter control system 300 and transmission 200 (see FIG. 2) is made possible.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. An electrified vehicle comprising:
a transmission including a traction motor powered by a traction battery; and
an inverter control system configured to control power supplied from the traction battery to the traction motor and connected atop the transmission at least at a first point and a second point, the second point displaced both laterally and longitudinally from the first point such that the inverter control system rotates about the first point in response to a longitudinal collision force exceeding a threshold force acting on the inverter control system.

2. The electrified vehicle of claim 1 further comprising a brake booster longitudinally spaced from the inverter control system and partially laterally overlapping an edge portion of the inverter control system.

3. The electrified vehicle of claim 2 wherein the second attachment point of the inverter control system comprises an elongated slot configured such that rotation of the inverter control system moves the edge portion so that the edge portion does not partially laterally overlap the brake booster when the inverter control system is translated longitudinally toward the brake booster.

4. The electrified vehicle of claim 3 wherein the inverter control system comprises a plurality of attachment points to connect the inverter control system atop the transmission, and wherein each of the plurality of attachment points comprises a slot.

5. The electrified vehicle of claim 4 wherein the slot comprises an arcuate slot.

6. The electrified vehicle of claim 4 wherein the slot comprises a wedge-shape slot.

7. The electrified vehicle of claim 1 wherein the inverter control system comprises one or more fastening means each arranged within a recess in an upper surface of the inverter control system, wherein at least one recess is configured as a slot having a longitudinal axis for guided movement of an associated one of the fastening means.

8. The electrified vehicle of claim 7 wherein each recess is configured such that rotation of the inverter control system causes a corresponding displacement of at least a portion of the inverter control system in a lateral direction transverse to a vehicle longitudinal axis.

9. The electrified vehicle of claim 8 further comprising an electrical conduit extending through the inverter control system adjacent to the first point.

10. The electrified vehicle of claim 9 further comprising a power supply cable extending through the electrical conduit and electrically connecting the inverter control system and the traction motor of the transmission.

11. A vehicle comprising:
a transmission including an electric machine powered by a traction battery; and
an inverter control system configured to control power supplied from the traction battery to the electric machine and connected atop the transmission;
a brake booster positioned at least partially between the inverter control system and an occupant cabin; and
connecting means for connecting the inverter control system to the transmission and allowing limited rotation of the inverter control system relative to the transmission about a pivot point and a guide point during a vehicle frontal collision such that a leading edge of the inverter control system laterally overlapping relative to the brake booster prior to the vehicle frontal collision is laterally displaced to a non-overlapping lateral position by a longitudinal force from the vehicle frontal collision.

12. The vehicle of claim 11 wherein the connecting means comprises at least one recess in a top surface of the inverter control system having an elongated slot.

13. The vehicle of claim 12 further comprising at least one cable duct disposed adjacent to the pivot point and configured to house electrical conductors extending therethrough that provide power from the inverter control system to the electric machine of the transmission.

14. The vehicle of claim 13 wherein the elongated slot comprises an arcuate slot.

15. The vehicle of claim 13 wherein the elongated slot comprises a conical opening.

16. A vehicle having an engine compartment and an occupant compartment, the vehicle comprising:
   an engine disposed within the engine compartment;
   a transmission including a traction motor powered by a traction battery and disposed within the engine compartment;
   an inverter control system configured to control power provided to the traction motor from the traction battery and disposed within the engine compartment;
   a brake booster disposed within the engine compartment longitudinally between a portion of the inverter control system and the occupant compartment; and
   connecting means for securing the inverter control system to the transmission and allowing rotation of the inverter control system relative to the transmission around a pivot point in response to a longitudinal collision force to displace the portion of the inverter control system laterally away from the brake booster, wherein the rotation is limited by a guiding point of the connecting means.

17. The vehicle of claim 16 wherein the connecting means comprises at least one bolt, a circular recess in a top surface of the inverter control system corresponding to the pivot point, and an elongated recess in the top surface of the inverter control system corresponding to the guiding point.

18. The vehicle of claim 17 wherein the guiding point is one of a plurality of guiding points each having a corresponding elongated recess in the top surface of the inverter control system.

19. The vehicle of claim 17 wherein the elongated recess comprises an arcuate recess.

20. The vehicle of claim 17 wherein the inverter control system comprises an electrical cable conduit disposed adjacent the pivot point.

* * * * *